(12) United States Patent
Huang

(10) Patent No.: US 7,923,153 B2
(45) Date of Patent: Apr. 12, 2011

(54) LINEAR ETHER ELECTROLYTE WITH ASYMMETRIC END GROUPS FOR USE IN LITHIUM BATTERIES

(75) Inventor: Weiwei Huang, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 442 days.

(21) Appl. No.: 12/111,520

(22) Filed: Apr. 29, 2008

(65) Prior Publication Data

US 2009/0269675 A1  Oct. 29, 2009

(51) Int. Cl.
*H01M 4/48* (2010.01)
(52) U.S. Cl. ........ 429/231.95; 429/231.1; 429/221; 429/322; 429/334; 429/335; 429/337; 429/341
(58) Field of Classification Search ............ 429/231.95, 429/231.1, 221, 322, 334, 335, 337, 341
See application file for complete search history.

(56) References Cited

U.S. PATENT DOCUMENTS

| | | | |
|---|---|---|---|
| 3,996,069 A | 12/1976 | Kronenberg | |
| 4,129,691 A | 12/1978 | Broussely | |
| 4,804,595 A | 2/1989 | Bakos et al. | |
| 5,229,227 A | 7/1993 | Webber | |
| 5,290,414 A | 3/1994 | Marple | |
| 5,514,491 A | 5/1996 | Webber | |
| 5,691,083 A | 11/1997 | Bolster | |
| 6,218,054 B1 | 4/2001 | Webber | |
| 7,189,477 B2 | 3/2007 | Mikhaylik | |
| 7,316,868 B2 | 1/2008 | Gorkovenko | |
| 2005/0112462 A1 | 5/2005 | Marple | |
| 2005/0175904 A1 | 8/2005 | Gorkovenko | |
| 2005/0233214 A1 | 10/2005 | Marple et al. | |
| 2006/0046154 A1 | 3/2006 | Webber et al. | |
| 2007/0275298 A1 | 11/2007 | Igoris et al. | |
| 2008/0026288 A1 | 1/2008 | Marple et al. | |
| 2008/0026290 A1 | 1/2008 | Jiang et al. | |
| 2008/0026296 A1 | 1/2008 | Bowden et al. | |

FOREIGN PATENT DOCUMENTS

| | | |
|---|---|---|
| EP | 0529802 B1 | 4/2000 |
| EP | 1879252 A1 | 1/2008 |
| WO | 00/46870 A1 | 8/2000 |
| WO | 2006/026234 A2 | 3/2006 |

OTHER PUBLICATIONS

U.S. Application of Kaplin, et al., entitled Electrochemical Cell with Thermal Current Interrupting Switch, submitted to the U.S. Patent Office on Apr. 16, 2007, U.S. Appl. No. 11/787,436.
Patent Cooperation Treaty (PCT), International Search Report and Written Opinion for Application PCT/US2009/002491 filed Apr. 22, 2009, Mailed Aug. 6, 2009, European Patent Office, Netherlands.

*Primary Examiner* — Laura S Weiner
(74) *Attorney, Agent, or Firm* — Robert C. Baraona

(57) ABSTRACT

A primary electrochemical cell and electrolyte incorporating a linear asymmetric ether is disclosed. The ether may include EME, used in combination with DIOX and DME, or have the general structural formula $R_1-O-CH_2-CH_2-O-R_2$ or $R_1-O-CH_2-CH(CH_3)-O-R_2$, where a total of at least 7 carbon atoms must be present in the compound, and $R_1$ and $R_2$ consist alkyl, cyclic, aromatic or halogenated groups but cannot be the same group (i.e., $R_1 \neq R_2$).

3 Claims, 1 Drawing Sheet

LINEAR ETHER ELECTROLYTE WITH ASYMMETRIC END GROUPS FOR USE IN LITHIUM BATTERIES

This invention was made with Government support under W15P7T-07-C-P017 awarded by the United States' Army CECOM. The Government has certain rights in the invention.

BACKGROUND OF INVENTION

This invention relates to a nonaqueous electrolyte for a primary electrochemical cell, such as a lithium/iron disulfide cell. More specifically, a ternary electrolyte including dioxolane, dimethoxyethane and a linear ether with asymmetric end groups is contemplated.

Batteries are used to provide power to many portable electronic devices. In today's consumer-driven device market, standardized primary cell sizes (e.g., AA or AAA) and specific nominal voltages (typically 1.5 V) are preferred. Moreover, consumers frequently opt to use primary batteries for their low cost, convenience, reliability and sustained shelf life as compared to comparable, currently available rechargeable (i.e., secondary) batteries. Primary lithium batteries (those that contain metallic lithium or lithium alloy as the electrochemically active material of the negative electrode) are becoming increasingly popular as the battery of choice for new devices because of trends in those devices toward smaller size and higher power.

One type of lithium battery that is particularly useful for 1.5 V consumer devices is the lithium-iron disulfide (or $LiFeS_2$) battery, having the IEC designations FR6 for AA size and FR03 for AAA size. $LiFeS_2$ cells offer higher energy density, especially at high drain rates in comparison to alkaline, carbon zinc or other primary (i.e., non-rechargeable) battery systems. Such batteries use iron disulfide, $FeS_2$ (also referred to as pyrite or iron pyrite, which the preferred mineral form of iron disulfide for battery applications), as the electrochemically active material of the positive electrode.

As a general rule, the electrolyte in any battery must be selected to provide sufficient electrical conductivity to meet the cell discharge requirements over the desired temperature range. As demonstrated by U.S. Pat. No. 4,129,691 to Brousely, increasing the solute (i.e., salt) concentration in a lithium battery electrolyte is expected to result in a corresponding increase in the conductivity and usefulness of that electrolyte. However, other limitations—such as the solubility of the solute in specific solvents, the formation of an appropriate passivating layer on lithium-based electrodes and/or the compatibility of the solvent with the electrochemically active or other materials in the cell—make the selection of an appropriate electrolyte system difficult. As a non-limiting example, U.S. Pat. No. 4,804,595 to Bakos describes how certain ethers are not miscible with solvents such as propylene carbonate. Additional electrolyte deficiencies and incompatibilities are well known and documented in this art, particularly as they relate to $LiFeS_2$ cells and lithium's reactivity with many liquids, solvents and common polymeric sealing materials.

Ethers are often desirable as lithium battery electrolyte solvents because of their generally low viscosity, good wetting capability, good low temperature discharge performance and good high rate discharge performance, although their polarity is relatively low compared to some other common solvents. Ethers are particularly useful in cells with pyrite because they tend to be more stable as compared to higher voltage cathode materials in ethers, where degradation of the electrode surface or unwanted reactions with the solvent(s) might occur (e.g., polymerization). Among the ethers that have been used in $LiFeS_2$ cells are 1,2-dimethoxyethane ("DME") and 1,3-dioxolane ("DIOX"), whether used together as taught by U.S. Pat. No. 5,514,491 or 6,218,054 or European Patent 0 529 802 B1, all to Webber, or used in whole or in part as a blend of solvents as suggested by U.S. Pat. No. 7,316,868 to Gorkovenko (use of DIOX and 5-6 carbon 1,3-dialkoxyalkanes); U.S. Pat. No. 3,996,069 to Kronenberg (use of 3-methyl-2-oxazolidone and DIOX and/or DME); or U.S. Patent Publication No. 2008/0026296A1 to Bowden (use of sulfolane and DME).

Other solvents not specifically containing DIOX or DME may also be possible, such as those disclosed in U.S. Pat. No. 5,229,227 to Webber (use of 3-methyl-2-oxazolidone with polyalkylyene glycol ethers such as diglyme). However, because of interactions among solvents, as well as the potential effects of solutes and/or electrode materials on those solvents, ideal electrolyte solvent blends and the resulting discharge performance of the cell are often difficult to predict without actually testing the proposed blend in a functioning electrochemical cell.

Another class of ethers has been proposed for use as electrolytes, as disclosed in U.S. Pat. No. 7,316,868. DIOX is used in the blend but the DME is preferentially replaced by one or more 1,2- or 1,3-dialkoxyalkanes having 5 or 6 carbon atoms, such as 1-ethoxy-2-methoxyethane ("EME"), 1-methoxy-2-propoxyethane, 1,2-dimethoxypropane, 1-ethoxy-2-methoxypropane, 2-ethoxy-1-methoxypropane, 1,3-dimethoxypropane, and 1,3-dimethoxybutane. The resulting solvent blend is expected to have particular utility in enhancing the cycle life of lithium-sulfur batteries specifically in comparison to previously known electrolytes containing DME instead of EME (see, e.g., Table 2).

A wide variety of solutes has been used in $LiFeS_2$ cell electrolytes, including lithium iodide (LiI), lithium trifluoromethanesulfonate ($LiCF_3SO_3$ or "lithium triflate"), lithium bistrifluoromethylsulfonyl imide ($Li(CF_3SO_2)_2N$ or "lithium imide"), lithium perchlorate ($LiClO_4$), lithium hexafluoroarsenate ($LiAsF_6$) and others. While electrolytes containing lithium triflate can provide fair cell electrical and discharge characteristics, such electrolytes have relatively low electrical conductivity. Furthermore, lithium triflate is relatively expensive. Lithium iodide (LiI) has been used as an alternative to lithium triflate to both reduce cost and improve cell electrical performance, as discussed in the previously identified U.S. Pat. No. 5,514,491 to Webber. One particular brand of AA-sized FR06 batteries sold by Energizer Holdings Inc. currently uses a nonaqueous electrolyte with 0.75 molar concentration of LiI salt in a solvent mixture containing DIOX and DME.

Lithium iodide and lithium triflate salts have been used in combination to provide improved low temperature discharge performance, as described in related U.S. Patent Publication No. 2006/0046154 to Webber. As discussed therein, $LiFeS_2$ cells with a high ether content and LiI as a solute (either the sole solute or in combination with lithium triflate) may sometimes, on high rate discharge at low temperatures, exhibit a rapid drop in voltage at the beginning of discharge. The voltage can drop so low that a device being powered by the cell will not operate. Eliminating LiI as a solute and making lithium triflate the sole solute can solve this problem, but the operating voltage can then be too low on high rate and high power discharge at room temperature. And the use of perchlorates as the sole, primary salt or even as a co-salt may be problematic because of the potential health and safety issues posed by these compounds.

Additives may be employed in the electrolyte to enhance certain aspects of a cell and/or its performance. For example, U.S. Pat. No. 5,691,083 to Bolster describes the use of a very low concentration of potassium salt additives to achieve a desired open circuit voltage in cells with a cathode material including $FeS_2$, $MnO_2$ or $TiS_2$. U.S. Publication No. 2008/0026290 to Jiang discloses the use of an aluminum additive to slow the development of a passivation film on the surface of the lithium electrode. In each of these examples, the benefit of the additive(s) selected must be balanced against any deleterious reactions or effects (in terms of discharge performance, safety and longevity of the battery).

Finally, as mentioned above, it is believed higher concentrations of solute(s) normally improve the conductivity of the electrolyte. However, certain systems (typically in rechargeable lithium-sulfur battery systems where non-chalcogenic polysulfides are the preferred cathode material) utilize a "catholyte" where portions of the electrode itself dissolve into the electrolyte solution to provide ionic conductivity. In such systems, minimal to non-existent concentrations of lithium ions may be provided to a fully charged cell without compromising performance as taught by U.S. Pat. No. 7,189,477 to Mikhaylik. Ultimately, $LiFeS_2$ and other lithium electrochemical cells do not exhibit this propensity to provide ions from the electrodes to the electrolyte, thereby eliminating the usefulness of this approach in $LiFeS_2$ systems and more generally illustrating the pitfalls associated with blindly applying teachings from a given electrochemical system to another, dissimilar system.

SUMMARY OF INVENTION

An electrolyte consisting of one or more solutes, such as lithium iodide and/or other common salts, dissolved in a nonaqueous, organic solvent blend consisting essentially of 1,3-dioxolane, 1,2-dimethoxyethane and 1-ethoxy-2-methoxyethane is contemplated. The DME and EME must be provided at a level of at least 10 vol. % each. Preferably, the DIOX is provided at greater than 40 vol. %. In some embodiments, it is preferred to provide the DME in twice the volume of the EME present in the blend. In other embodiments, the DME and/or EME are provided as 10-30 vol. % of the overall solvent blend.

A lithium-iron disulfide electrochemical cell is also contemplated. The cell has a lithium-based anode, an iron disulfide-based cathode and an electrolyte comprising DIOX, DME and EME, where DME and EME each constitute at least 10 vol. % of the solvent blend used in the electrolyte. As above, 10-30 vol. % of DME and/or EME is possible, and the DIOX preferably constitutes over half of the solvent blend by volume. The solute may include lithium iodide, although other salts are contemplated. The resulting cell exhibits superior low temperature performance as compared to those known in the art.

Finally, a primary electrochemical cell with a linear asymmetric ether electrolyte is contemplated. The electrolyte includes at least one solute dissolved in a solvent consisting essentially of at least 40 vol. % of DIOX, at least 10 vol. % of one linear asymmetric ether and an optional amount of DME. The asymmetric ether(s) is/are selected from the group consisting of: EME, a first compound with the formula $R_1$—O—$CH_2$—$CH_2$—O—$R_2$ and a second compound with the formula $R_1$—O—$CH_2$—$CH(CH_3)$—O—$R_2$. However, for both the first and second compounds, a total of at least 7 carbon atoms must be present in the compound, and $R_1$ and $R_2$ consist alkyl, cyclic, aromatic or halogenated groups but cannot be the same group (i.e., $R_1 \neq R_2$).

DETAILED DESCRIPTION OF INVENTION

Figure 1:
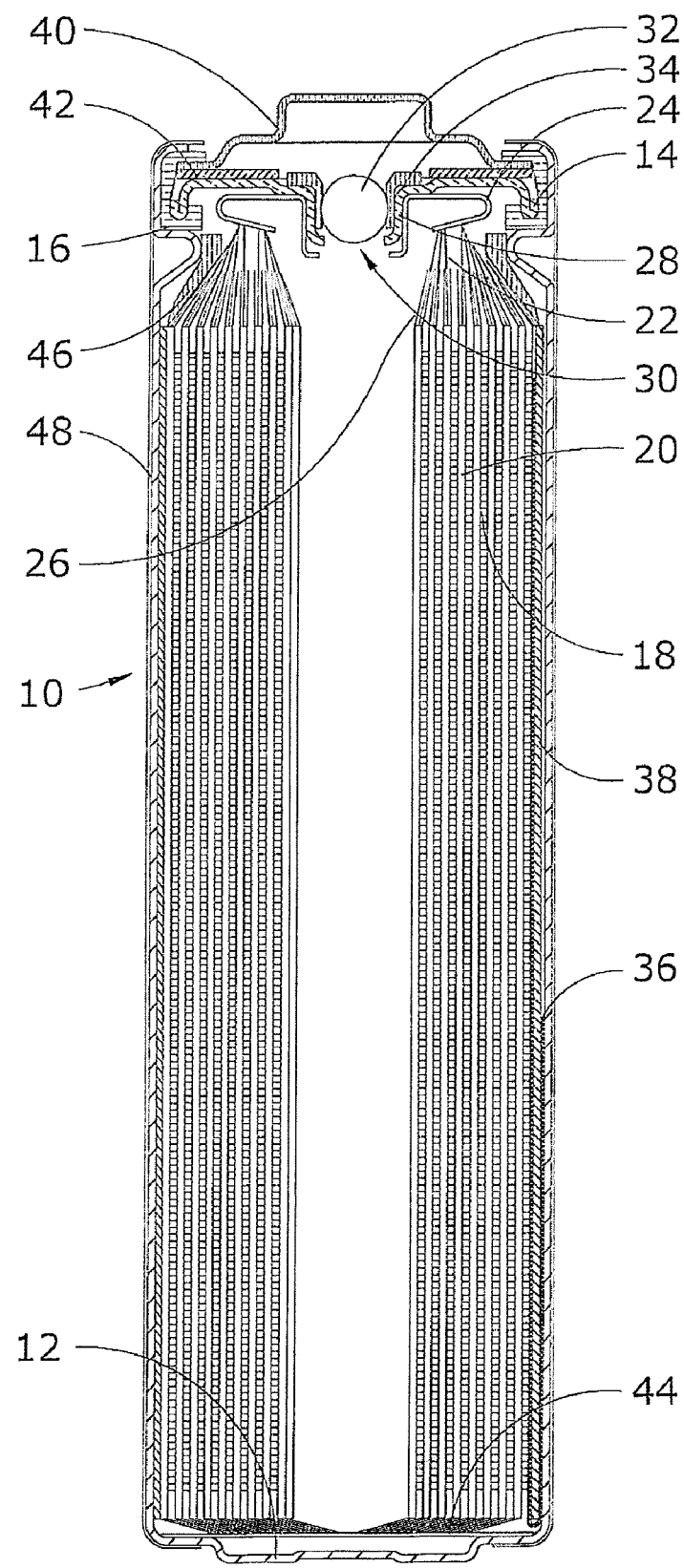
FIG. 1 shows a cross sectional view of a $LiFeS_2$ battery according to one embodiment of the invention.

Unless otherwise specified, as used herein the terms listed below are defined and used throughout this disclosure as follows:

ambient (or room) temperature—between about 20° C. and about 25° C.; unless otherwise stated, all examples, data and manufacturing information were provided/conducted at ambient temperature.

anode—the negative electrode; more specifically, within the meaning of the invention, it consists essentially of lithium or an alloy containing at least 90% lithium by weight as the primary electrochemically active material.

cathode—the positive electrode; more specifically, within the meaning of the invention, it comprises iron disulfide as the primary electrochemically active material, along with one or more rheological, polymeric and/or conductive additives, coated onto a metallic current collector.

cell housing—the structure that physically encloses the electrochemically active materials, safety devices and other inert components which comprise a fully functioning battery; typically consists of a container (formed in the shape of a cup, also referred to as a "can") and a closure (fitting over the opening of the container, typically consists of venting and sealing mechanisms for impeding electrolyte egress and moisture/atmospheric ingress).

DIOX—a dioxolane-based solvent, typically 1,3-dioxolane

DME—a dimethoxyethane-based solvent, typically 1,2-dimethoxyethane electrolyte—one or more solutes dissolved within one or more liquid, organic solvents; does not include any electrochemical systems where the cathode is expected to partially or completely dissolve in order to contribute ionic conductivity to the cell (i.e., a "catholyte" such as those utilized in lithium-sulfur batteries)

EME—an ethoxy-methoxyethane-base solvent, typically 1-ethoxy, 2-methoxyethane jellyroll (or spirally wound) electrode assembly—strips of anode and cathode, along with an appropriate polymeric separator, are combined into an assembly by winding along their lengths or widths, e.g., around a mandrel or central core.

nominal—a value, specified by the manufacturer, that is representative of what can be expected for that characteristic or property.

percent discharge—the percentage of the capacity removed from a cell as a result of its intended use, but excluding capacity removed by deliberate conditioning or preliminary discharge performed by a manufacturer to make the cell more suitable for consumer use.

salt—as part of the electrolyte, an ionizable compound, typically including lithium or some other metal, dissolved in one or more solutes.

Cell Design

The invention will be better understood with reference to FIG. 1, which shows a specific cell design that may be implemented. Cell 10 is an FR6 type cylindrical $LiFeS_2$ battery cell, although the invention should have equal applicability to FR03 or other cylindrical cells. Cell 10 has a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10.

The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal lead (or tab) 36. The lead 36 is fastened to the anode 18, extends from the bottom of the electrode assembly, is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example.

An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12.

Cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10. In other embodiments, the pressure relief vent can be an aperture closed by a rupture membrane, such as disclosed in U.S. Patent Application Publication No. 2005/0244706, herein fully incorporated by reference, or a relatively thin area such as a coined groove, that can tear or otherwise break, to form a vent aperture in a portion of the cell, such as a sealing plate or container wall.

The terminal portion of the electrode lead 36, disposed between the side of the electrode assembly and the side wall of the can, may have a shape prior to insertion of the electrode assembly into the can, preferably non-planar that enhances electrical contact with the side wall of the can and provides a spring-like force to bias the lead against the can side wall. During cell manufacture, the shaped terminal portion of the lead can be deformed, e.g., toward the side of the electrode assembly, to facilitate its insertion into the can, following which the terminal portion of the lead can spring partially back toward its initially non-planar shape, but remain at least partially compressed to apply a force to the inside surface of the side wall of the can, thereby making good physical and electrical contact with the can.

Electrolyte

A nonaqueous electrolyte, containing water only in very small quantities as a contaminant (e.g., no more than about 500 parts per million by weight, depending on the electrolyte salt being used), is deposited into the cell housing during manufacture. Because the electrolyte is the primary media for ionic transfer in a $LiFeS_2$ cell, selection of an appropriate solvent and solute combination is critical to optimizing the performance of the cell. Moreover, the solute and solvents selected for the electrolyte must possess appropriate miscibility and viscosity for the purposes of manufacture and use of the resulting cell, while still delivering appropriate discharge performance across the entire spectrum of temperatures potentially experienced by batteries (i.e., about −40° C. to 60° C.). Furthermore, the electrolyte must be non-reactive and non-volatile (or at least possess a low enough boiling point to be practically retained by conventional polymeric seals and closure mechanisms).

Miscibility and viscosity of the solvents and the electrolyte is key to the manufacturing and operational aspects of the battery. All solvents used in the blend must be completely miscible to insure a homogeneous solution. Similarly, in order to accommodate the requirements of high volume production, the solvents must possess a sufficiently low viscosity to flow and/or be dispensed quickly.

Additionally, the solvents and the electrolyte must possess a boiling point appropriate to the temperature range in which the battery will most likely be exposed and stored (i.e., −40° C. to 60° C.). More specifically, the solvent(s) must be sufficiently non-volatile to allow for safe storage and operation of the battery within this stated temperature range. Similarly, the solvents and the electrolyte must not react with the electrode materials in a manner that degrades the electrodes or adversely affects performance of the battery upon discharge. Suitable organic solvents that have been or may be used in $LiFeS_2$ cells have included one or more of the following: 1,3-dioxolane; 1,3-dioxolane based ethers (e.g., alkyl- and alkoxy-substituted DIOX, such as 2-methyl-1,3-dioxolane or 4-methyl-1,3-dioxolane, etc.); 1,2-dimethoxyethane; 1,2-dimethoxyethane-based ethers (e.g., diglyme, triglyme, tetraglyme, ethyl glyme, etc.); ethylene carbonate; propylene carbonate; 1,2-butylene carbonate; 2,3-butylene carbonate; vinylene carbonate; methyl formate; γ-butyrolactone; sulfolane; acetonitrile; N,N-dimethyl formamide: N,N-dimethylacetamide; N,N-dimethylpropyleneurea; 1,1,3,3-tetramethylurea; beta aminoenones; beta aminoketones; methyltetrahydrofurfuryl ether; diethyl ether; tetrahydrofuran ("THF"); 2-methyl tetrahydrofuran; 2-methoxytetrahydrofuran; 2,5-dimethoxytetrahydrofuran; 3,5-dimethylisoxazole ("DMI"); 1,2-dimethoxypropane ("DMP"); and 1,2-dimethoxypropane-based compounds (e.g., substituted DMP, etc.).

Salts should be nearly or completely soluble with the selected solvent(s) and, as with the discussion of solvent characteristics above, without any degradation or adverse effects. Examples of typical salts used in $LiFeS_2$ cells include LiI ("lithium iodide"), $LiCF_3SO_3$ ("lithium triflate"), $LiClO_4$ ("lithium perchlorate"), $Li(CF_3SO_2)_2N$ ("lithium imide"), $Li(CF_3CF_2SO_2)_2N$ and $Li(CF_3SO_2)_3C$. Other potential candidates are lithium bis(oxalato)borate, lithium bromide, lithium hexafluorophosphate, potassium hexafluorophosphate and lithium hexafluoroarsenate. Two key aspects of salt selection are that they do not react with the housing, electrodes, sealing materials or solvents and that they do not degrade or precipitate out of the electrolyte under the typically expected conditions to which the battery will be exposed and expected to operate (e.g., temperature, electrical load, etc.). It is possible to use more than one solute to maximize certain aspects of performance.

Notably, unless noted to the contrary, the concentration of the solutes relative to the solvents as described herein is best expressed as moles of solute per kilogram of solution (molality). Molality of a solution remains constant irrespective of the physical conditions like temperature and pressure, whereas volume of some solvents typically increases with in temperature thereby yielding a decrease in molarity (i.e., moles per liter). Nevertheless, at ambient temperatures, the difference between molality and molarity may be negligible.

In order to sustain sufficient service across the entire spectrum of temperatures (−40° C. to 60° C. or greater), a ternary solvent blend comprising DIOX, DME and EME was developed. Notably, unlike DME, the end groups for EME (i.e., the alkyl groups on the opposite terminal ends of the ether chain) are not identical:

EME structure: $CH_3$—O—$CH_2$—$CH_2$—O—$C_2H_5$
DME structure: $CH_3$—O—$CH_2$—$CH_2$—O—$CH_3$ It is believed that these asymmetric end groups on a linear ether, when dispersed in a mixture of DIOX and DME, should reduce the melting point of the overall solvent blend, thereby enabling improved low temperature performance for $LiFeS_2$ cells. In essence, the EME acts as a cosolvent additive. Furthermore, it is believed that any asymmetry in the linear ether additive could potentially display the desired characteristics. For example, 1-ethoxy-2-methoxypropane ("DMP") could also be used. In fact, any linear ether of the general formula $R_1$—O—$CH_2$—$CH_2$—O—$R_2$ or $R_1$—O—$CH_2$—CH($CH_3$)—O—$R_2$ is a potential solvent, so long as $R_1 \neq R_2$ and the entire compound has at least 7 carbon atoms in total. For example, $R_1$ and $R_2$ could be short alkyl (e.g., methy, ethyl, propyl, etc.), cyclic, aromatic and/or halogenated (e.g., fluorinated, chlorinated, etc.) groups.

DIOX and DME are preferred solvents. At least greater than 10 volume percent of DME should be provided, with the balance being DIOX and a third co-solvent, such as EME. More preferably, DME should be provided in an amount that is between one half to twice the amount of EME provided, again with the balance being DIOX.

EME is preferred as a third cosolvent, in addition to DME. EME should be provided as at least 10 volume percent of the solvent or, more preferably, as at least 15 volume percent. Up to 30 volume percent or greater of EME could be used while still demonstrating the benefits of this invention.

Other linear, asymmetric ethers can be used as the third co-solvent, in combination with DIOX and DME, or possibly as a solvent in combination with DIOX only. These linear asymmetric ethers are selected based on the following criteria: (i) the base compound has a structure/formula of either $R_1$—O—$CH_2$—$CH_2$—O—$R_2$ or $R_1$—O—$CH_2$—CH($CH_3$)—O—$R_2$. In either case, $R_1$ and $R_2$ can be alkyl (e.g., methy, ethyl, propyl, etc.), cyclic, aromatic and halogenated (e.g., fluorinated, chlorinated, etc.) groups, provided that $R_1$ is not the same group as $R_2$ and further provided that the compound, when considered as a whole, has at least 7 or more carbon atoms. As a non-limiting example, in the event that $R_1$—O—$CH_2$—CH($CH_3$)—O—$R_2$ is the structure, $R_1$ could be a methyl (—$CH_3$) group and $R_2$ could be isopropyl (—CH($CH_3)_2$) group. Other combinations are possible, with aromatic and cyclic groups incorporating non-carbon atoms as a constituent of the ring structure specifically included as potential candidates. In this case, DIOX again should form at least 40 vol. % of the solvent blend. DME, EME, DMP or other similar solvents can be used in combination with these 7+carbon linear, asymmetric ethers.

Lithium iodide is the preferred solute, although other solutes provided to this solvent blend would be expected to exhibit similar benefits (including but not limited to lithium perchlorate, lithium triflate, lithium imide and the like). The preferred solute concentration is 0.75 molal.

When this electrolyte is used in conjunction with a $LiFeS_2$ battery according to the configuration described above, extraordinary improvements are observed at extremely low temperatures (i.e., below −20° C.). In many embodiments, double the amount of capacity can be expected. Moreover, these improvements can be realized without sacrificing performance at room temperature or on specialized discharge tests, such as the American National Standard Institute (ANSI) digital still camera pulse test.

Other Cell Components

The cell container is often a metal can with a closed bottom such as the can in FIG. 1. The can material will depend in part of the active materials and electrolyte used in the cell. A common material type is steel. For example, the can may be made of steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

If a ball vent is used, the vent bushing is made from a thermoplastic material that is resistant to cold flow at high temperatures (e.g., 75° C.). The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoro-alkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler), polythlalamide (e.g., AMODEL® ET 10011 NT, from Solvay Advanced Polymers, Houston, Tex.) and polyphenylene sulfide (e.g., e.g., XTEL™ XE3035 or XE5030 from Chevron Phillips in The Woodlands, Tex., USA) are preferred thermoplastic bushing materials.

The vent ball itself can be made from any suitable material that is stable in contact with the cell contents and provides the desired cell sealing and venting characteristic. Glasses or metals, such as stainless steel, can be used. In the event a foil vent is utilized in place of the vent ball assembly described above (e.g., pursuant to U.S. Patent Application Publication No. 2005/0244706), the above referenced materials may still be appropriately substituted.

Electrodes

The anode comprises a strip of lithium metal, sometimes referred to as lithium foil. The composition of the lithium can vary, though for battery grade lithium, the purity is always high. The lithium can be alloyed with other metals, such as aluminum, to provide the desired cell electrical performance or handling ease, although the amount of lithium in any alloy should nevertheless be maximized and alloys designed for high temperature application (i.e., above the melting point of pure lithium) are not contemplated. Appropriate battery grade lithium-aluminum foil, containing 0.5 weight percent aluminum, is available from Chemetall Foote Corp., Kings Mountain, N.C., USA.

Other anode materials may be possible, including sodium, potassium, zinc, magnesium and aluminum, either as co-anodes, alloying materials or distinct, singular anodes. Ultimately, the selection of an appropriate anode material will be influenced by the compatibility of that anode with LiI, the cathode and/or the ether(s) selected.

As in the cell in FIG. 1, a separate current collector (i.e., an electrically conductive member, such as a metal foil, on which the anode is welded or coated OR an electrically conductive strip running along the length of the anode) is not needed for the anode, since lithium has a high electrical conductivity. By not utilizing such a current collector, more space is available within the container for other components, such as active materials. Anode current collectors may be made of copper and/or other appropriate high conductivity metals so as long as they are stable when exposed to the other interior components of the cell (e.g., electrolyte), and therefore also add cost.

The electrical connection must be maintained between each of the electrodes and the opposing terminals proximate to or integrated with the housing. An electrical lead 36 can be made from a thin metal strip connecting the anode or negative electrode to one of the cell terminals (the can in the case of the FR6 cell shown in FIG. 1). When the anode includes such a lead, it is oriented substantially along a longitudinal axis of the jellyroll electrode assembly and extends partially along a width of the anode. This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead and have minimal or no impact on service life of the cell. A preferred material is 304 stainless steel. Examples of other suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the nonaqueous electrolyte. Examples of metals generally to be avoided but can be present as impurities in relatively minor amounts are aluminum, iron and zinc.

The cathode is in the form of a strip that comprises a current collector and a mixture that includes one or more electrochemically active materials, usually in particulate form. Iron disulfide ($FeS_2$) is a preferred active material although the invention is applicable to most cathode materials that are stable with LiI and have a potential vs. Li that is less than 2.8V, possibly including CuO, $CuO_2$ and oxides of bismuth (e.g., $Bi_2O_3$, etc.). Notably, $MnO_2$ is not suitable because these cathodes have a potential that is too high when compared to the $I_2/I^-$ redox couple.

In a $LiFeS_2$ cell, the active material comprises greater than 50 weight percent $FeS_2$. The cathode can also contain one or more additional active materials mentioned above, depending on the desired cell electrical and discharge characteristics. More preferably the active material for a $LiFeS_2$ cell cathode comprises at least 95 weight percent $FeS_2$, yet more preferably at least 99 weight percent $FeS_2$, and most preferably $FeS_2$ is the sole active cathode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA. A more comprehensive description of the cathode, its formulation and a manner of manufacturing the cathode is provided below.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

The cathode is electrically connected to the positive terminal of the cell. This may be accomplished with an electrical lead, often in the form of a thin metal strip or a spring, as shown in FIG. 1, although welded connections are also possible. The lead is often made from nickel plated stainless steel. Still another embodiment may utilize a connection similar to that disclosed in United States Patent Publication No. 2007/0275298, and/or U.S. patent application Ser. No. 11/787,436, which should publish on or after Oct. 16, 2008, both of which are commonly assigned to the assignee of this application and incorporated by reference herein. Notably, to the extent a cell design may utilize one of these alternative electrical connectors/current limiting devices, the use of a PTC may be avoided. In the event an optional current limiting device, such as a standard PTC, is utilized as a safety mechanism to prevent runaway discharge/heating of the cell, a suitable PTC is sold by Tyco Electronics in Menlo Park, Calif., USA. Other alternatives are also available.

Separator

The separator is a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 µm thick, and more preferably no more than 22 µm thick, such as 20 µm or 16 µm. A high tensile stress is desirable, preferably at least 800, more preferably at least 1000 kilograms of force per square centimeter (kgf/cm$^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 µm to 0.40 µm, more preferably no greater than 0.20 µm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in U.S. Patent Publication No. 2005/0112462, which is hereby incorporated by reference.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 µm nominal thickness, and Setela 16MMS grade has a 16 µm nominal thickness. Suitable separators with similar properties are also available from Entek Membranes in Lebanon, Oreg., USA.

Cell Construction and Manufacture

The anode, cathode and separator strips are combined together in an electrode assembly. The electrode assembly may be a spirally wound design, such as that shown in FIG. 1, made by winding alternating strips of cathode, separator, anode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The anode can be the outermost electrode, as shown in FIG. 1, or the cathode can be the outermost electrode. Either electrode can be in electrical contact with the cell container, but internal short circuits between the outmost electrode and the side wall of the container can be avoided when the outermost electrode is the same electrode that is intended to be in electrical contact with the can.

The cell can be closed and sealed using any suitable process. Such processes may include, but are not limited to, crimping, redrawing, colleting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

With respect to the cathode, the cathode is coated onto a metallic foil current collector, typically an aluminum foil with a thickness between 18 and 20 µm, as a mixture which contains a number of materials that must be carefully selected to balance the proccessability, conductivity and overall efficiency of the coating. This coating consists primarily of iron disulfide (and its impurities); a binder that is generally used to hold the particulate materials together and adhere the mixture to the current collector; one or more conductive materials such as metal, graphite and carbon black powders added to provide improved electrical conductivity to the mixture, although the amount of conductor depends upon the electrical conductivity of the active material and binder, the thickness of the mixture on the current collector and the current collector design; and various processing or rheological aids that are dependent upon the coating method, the solvent used and/or the mixing method itself.

The following are representative materials that may be utilized in the cathode mix formulation: pyrite (at least 95% pure); conductor (Pure Black 205-110 from Superior Graphite Chicago, Ill., and/or MX15 from Timcal Westlake, Ohio); and binder/processing aids (styrene-ethylene/butylenes-styrene (SEBS) block copolymer, such as g1651 from Kraton Polymers Houston, Tex., and Efka 6950 from Heerenveen, Netherlands). Small amounts of impurities may be naturally present in any of the aforementioned materials, although care should be taken to utilize the highest purity pyrite source available so as to maximize the amount of $FeS_2$ present within the cathode.

It is also desirable to use cathode materials with small particle sizes to minimize the risk of puncturing the separator. For example, $FeS_2$ is preferably sieved through a 230 mesh (62 μm) screen before use or the $FeS_2$ may be milled or processed as described in U.S. Patent Publication No. 2005/0233214, which is incorporated by reference herein. Other cathode mix components should be carefully selected with eye toward chemical compatibility/reactivity and to avoid similar particle-size-based mechanical failure issues.

The cathode mixture is applied to the foil collector using any number of suitable processes, such as three roll reverse, comma coating or slot die coating. The methods of coating described in U.S. Patent Publication No. 2008/0026288 which is incorporated by reference, could be used. One preferred method of making $FeS_2$ cathodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit cathode material to the desired length. The use of volatile solvents maximize the efficiency of recovering such solvents, although it is possible to utilize other solvents, including aqueous-based compositions, in order to roll coat the cathode mix described above.

After or concurrent with drying to remove any unwanted solvents, the resulting cathode strip is densified via calendering or the like to further compact the entire positive electrode. In light of the fact that this strip will then be spirally wound with separator and a similarly (but not necessarily identically) sized anode strip to form a jellyroll electrode assembly, this densification maximizes loading of electrochemical material in the jellyroll electrode assembly. However, the cathode cannot be over-densified as some internal cathode voids are need to allow for expansion of the iron disulfide during discharge and wetting of the iron disulfide by the organic electrolyte, as well as to avoid unwanted stretching and/or delamination of the coating.

EXAMPLE 1

Six different solvent blends were prepared according to Table 1 below. Sample A is representative of the prior art, while Samples B and C contain insufficient amounts of DME and EME, respectively. All samples utilized 0.75 molal lithium iodide as the solute.

TABLE 1

| | Solvent Blends | | |
|---|---|---|---|
| Sample | Vol. % DIOX | Vol. % DME | Vol. % EME |
| A | 65.0 | 35.0 | 0 |
| B | 75.0 | 8.3 | 16.7 |
| C | 75.0 | 16.7 | 8.3 |
| D | 55.0 | 30.0 | 15.0 |
| E | 65.0 | 17.5 | 17.5 |
| F | 55.0 | 15.0 | 30.0 |

EXAMPLE 2

Six separate lots of standard $LiFeS_2$ AA-sized batteries, as described above, were constructed using spirally wound electrodes of lithium-aluminum alloy and iron disulfide slurry coated onto an aluminum foil collector separated by a polyethylene separator. The only variable between batteries was the choice of electrolyte, with each of the blends from Example 1 being incorporated into a number of cells. These batteries were then discharged under varying conditions as described in Tables 2-4 below, with the lot designation corresponding to the electrolyte samples in Example 1. Given statistical and other variables, any results within plus or minus approximately 5 to 10 percent of the baseline is considered acceptable service performance.

The "signature test" is a sequential continuous drain test at the stated rate. When the battery reaches the set cut off point for that drain (typically between 0.9 and 1.1 V, so long as the same cutoff is maintained throughout the entire test), it is allowed to rest for a standard period of time (typically, one hour) and then discharged at the next lowest rate. All performance values are normalized to electrolyte sample A, which represents the prior art.

TABLE 2

Relative performance at −40° C. on the signature test.
All values reported as percent service compared to Lot A

| Drain Rate (mA) | Lot A | Lot B | Lot C | Lot D | Lot E | Lot F |
|---|---|---|---|---|---|---|
| 1000 | 100 | 75 | 79 | 171 | 99 | 123 |
| 750 | 100 | 5 | 8 | 3517 | 89 | 4298 |
| 500 | 100 | 0 | 1 | 169 | 158 | 191 |
| 375 | 100 | 0 | 1 | 190 | 170 | 221 |
| 250 | 100 | 0 | 1 | 181 | 199 | 219 |
| 200 | 100 | 0 | 2 | 177 | 203 | 216 |
| 150 | 100 | 0 | 72 | 170 | 204 | 211 |
| 100 | 100 | 0 | 134 | 146 | 176 | 179 |

TABLE 3

Relative performance at 21° C. on the signature test.
All values reported as percent service compared to Lot A

| Drain Rate (mA) | Lot A | Lot B | Lot C | Lot D | Lot E | Lot F |
|---|---|---|---|---|---|---|
| 1000 | 100 | 94 | 96 | 98 | 97 | 94 |
| 750 | 100 | 95 | 96 | 98 | 97 | 94 |
| 500 | 100 | 96 | 96 | 99 | 98 | 95 |
| 375 | 100 | 96 | 96 | 99 | 98 | 95 |
| 250 | 100 | 97 | 96 | 99 | 99 | 96 |
| 200 | 100 | 97 | 96 | 99 | 99 | 96 |
| 150 | 100 | 97 | 96 | 99 | 99 | 96 |
| 100 | 100 | 97 | 96 | 99 | 99 | 96 |

TABLE 4

Relative performance on ANSI digital still camera test.
All values reported as percent service compared to Lot A

| Temperature | Lot A | Lot B | Lot C | Lot D | Lot E | Lot F |
|---|---|---|---|---|---|---|
| −20° C. | 100 | 13 | 87 | 101 | 92 | 77 |
| 21° C. | 100 | 87 | 93 | 98 | 93 | 91 |

Features of the invention and its advantages will be further appreciated by those practicing the invention, particularly with reference to the Examples, Figures, Tables and other information provided herein and any patent references above necessary to better understand the invention are incorporated herein to that extent. In the same manner, it will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

I claim:

1. An electrochemical cell comprising:
   a lithium-based anode;
   an iron-disulfide-based cathode; and
   an electrolyte consisting essentially of at least one solute dissolved in a solvent blend of 1,3-dioxolane (DIOX), 1,2-dimethoxyethane (DME) and 1-ethoxy-2-methoxyethane (EME), wherein the 1,2-dimethoxyethane (DME) and 1-ethoxy-2-methoxyethane (EME) are each provided as at least 10 vol. % of the solvent blend.

2. The electrochemical cell of claim 1 wherein the electrolyte is 40-80 vol. % 1,3-dioxolane (DIOX), 10-30 vol. % 1,2-dimethoxyethane (DME) and 10-30 vol. % 1-ethoxy-2-methoxyethane (EME).

3. The electrochemical cell of claim 2, wherein the solute includes lithium iodide.

* * * * *